United States Patent [19]
Ueda et al.

[11] Patent Number: 5,895,777
[45] Date of Patent: Apr. 20, 1999

[54] PETROLEUM ADDITIVE HAVING EXCELLENT STORAGE STABILITY AND HEAT STABILITY COMPRISING AN ALKALINE EARTH METAL SALT OF AROMATIC HYDROXYCARBOXYLIC ACID OR A SULFURIZED MIXTURE THEREOF

[75] Inventors: Sanae Ueda; Shinji Yamaoka; Jun Imai, all of Saitama, Japan

[73] Assignees: Cosmo Research Institute; Cosmo Oil Co., Ltd., both of Tokyo, Japan

[21] Appl. No.: 08/759,676

[22] Filed: Dec. 6, 1996

[30] Foreign Application Priority Data

Dec. 8, 1995 [JP] Japan .................... 7-345772
Oct. 26, 1996 [JP] Japan .................... 8-301215

[51] Int. Cl.$^6$ .................................. C10M 159/22
[52] U.S. Cl. .................... 508/331; 508/460; 508/518
[58] Field of Search .................... 508/460, 331, 508/518

[56] References Cited

U.S. PATENT DOCUMENTS

| | | | |
|---|---|---|---|
| 3,372,116 | 3/1968 | Meinhardt | 508/460 |
| 3,410,798 | 11/1968 | Cohen | 508/460 |
| 4,280,916 | 7/1981 | Richards et al. | |
| 4,810,398 | 3/1989 | Van Kruchten et al. | 508/460 |
| 5,162,085 | 11/1992 | Cane et al. | 508/460 |
| 5,437,803 | 8/1995 | Cane et al. | 508/331 |
| 5,602,084 | 2/1997 | Moreton | 508/460 |

FOREIGN PATENT DOCUMENTS

| | | |
|---|---|---|
| 0094814 | 11/1983 | European Pat. Off. . |
| 0271262 | 6/1988 | European Pat. Off. . |
| 0640682 | 3/1995 | European Pat. Off. . |
| 0404178 | 12/1997 | European Pat. Off. . |

*Primary Examiner*—Jacqueline V. Howard
*Attorney, Agent, or Firm*—Sughrue, Mion, Zinn, Macpeak & Seas, PLLC

[57] ABSTRACT

A petroleum additive having excellent storage stability and heat stability, which comprises an alkaline earth metal salt of aromatic hydroxycarboxylic acid containing a higher aliphatic carboxylic acid, a higher aliphatic amine or a higher aliphatic amide, or a sulfurized mixture thereof. A process for improving storage stability, heat stability and viscosity character of the petroleum additive.

10 Claims, No Drawings

5,895,777

PETROLEUM ADDITIVE HAVING EXCELLENT STORAGE STABILITY AND HEAT STABILITY COMPRISING AN ALKALINE EARTH METAL SALT OF AROMATIC HYDROXYCARBOXYLIC ACID OR A SULFURIZED MIXTURE THEREOF

FIELD OF THE INVENTION

The present invention relates to a petroleum additive having high oil solubility, storage stability and heat stability, which comprises an alkaline earth metal salt of aromatic hydroxycarboxylic acid having a specific composition, or a sulfurized mixture thereof; a method for improving stability of the petroleum additive; and a lubricant oil and fuel oil comprising the above-described petroleum additive having improved stability. A petroleum additive comprising an alkaline earth metal salt of aromatic hydroxycarboxylic acid or a sulfurized mixture thereof is mainly uses as an additive for a lubricating oil or fuel oil and is particularly useful as a detergent. The present invention brings about a further improvement in the properties of the above-described petroleum additive. In addition, the present invention relates to a method for the above improvement and a petroleum product containing the improved petroleum additive.

BACKGROUND OF THE INVENTION

In general, an alkaline earth metal salt of aromatic hydroxycarboxylic acid is also called an alkaline earth metal salicylate and is used as an additive to a lubricating oil for internal combustion engine (engine oil). It exhibits marked effects for the neutralization of acids such as oxyacid and sulfuric acid, dispersion of sludge, lacquer, carbon and the like, and prevention of corrosion and abrasion, choking of ring groove, hang-up of piston and the like. The alkaline earth metal salt of aromatic hydroxycarboxylic acid or a sulfurized mixture thereof is excellent in heat stability so that it can maintain its activity as a detergent for a long period of time. Furthermore, the alkaline earth metal salt of aromatic hydroxycarboxylic acid is used as an additive for a lubricating oil, and, in addition, it is added in a small amount to a diesel fuel oil or gasoline fuel oil. The object of the addition to such a fuel oil is to prevent adhesion of sludge, carbon and the like to a combustion chamber.

The alkaline earth metal salt of aromatic hydroxycarboxylic acid, which is a main component of an alkali earth metal salicylate, has heretofore been prepared by a complex process, for example, by forming an alkaline metal salt of alkyl phenol, carboxylating the resulting salt in accordance with Korbe-Schmitt reaction, neutralizing the alkali metal salt of aromatic hydroxycarboxylic acid thus obtained with an inorganic acid and then reacting the neutralized salt with an alkaline earth metal compound or by conducting double decomposition using calcium chloride or the like. However, these processes contain many and complex steps including a rinsing step for completely removing strong electrolytes such as strong acid, strong alkali or chloride which promote corrosion of a metal such as engine. Moreover, even by such a complex treatment, strong electrolytes cannot have been removed completely.

On the other hand, the present inventors has found that an alkaline earth metal salt of aromatic hydroxycarboxylic acid can be formed directly by reacting an alkali earth metal salt of a phenol with carbon dioxide and discloses this method |JP-A-61-282336 (the term "JP-A" as used herein means an "unexamined published Japanese patent application") and JP-B-4-25996 (the term "JP-B" as used herein means an "examined published Japanese patent publication"). That is, it is a process for producing an alkaline earth metal salt of aromatic hydroxycarboxylic acid, which comprises very simple steps, conducting direct metal addition of an alkaline earth metal reagent to an alkyl phenol as a raw material and treating the resulting product with a carbon dioxide gas.

This process is an industrially advantageous process which makes it possible to obtain an alkaline earth metal salt of aromatic hydroxycarboxylic acid far easier than the conventional process, because it requires neither formation nor decomposition of the alkaline metal salt during the process and additionally, it does not require a rinsing step of a strong electrolyte.

Since alkaline earth metal salt of aromatic hydroxycarboxylic acid has drawbacks in oil solubility and storage stability, a phenol as a raw material is desired to have a hydrocarbon side chain having at least 15 carbon atoms, preferably at least 18 carbon atoms.

However, since a phenol having such a long-chain hydrocarbon as a side chain is more expensive than a general-purpose phenol having 12 or less carbon atoms as a side chain, it is difficult to use the former phenol from the economical viewpoint. Furthermore, even if such a long-chain phenol is employed, it is not free from a drawback in stability upon long time storage.

A phenol is the most expensive material among the raw materials employed so that it is the common practice to recover a free phenol, which has remained in the reaction mixture, by distillation. It is however difficult to recover a long-chain phenol containing a hydrocarbon side chain having at least 15 carbon atoms, because its boiling point is high. Even if it is possible to recover by distillation, not only large utilities are required for the recovery but also the objective alkaline earth metal salt of aromatic hydroxycarboxylic acid is partially decarboxylated owing to the exposure to high temperatures not lower than 230° C.

It is therefore not recommendable to use a phenol containing a hydrocarbon side chain having at least 15 carbon atoms as a raw material. Accordingly, there has been a demand for the development of a petroleum additive which contains an alkaline earth metal salt of aromatic hydroxycarboxylic acid—for which a phenol containing a hydrocarbon side chain having not more than 15 carbon atoms, preferably not more than 12 carbon atoms, is used as a raw material—and which is excellent in oil solubility and storage stability. When a phenol containing a hydrocarbon side chain having 15 or less carbon atoms is used in the conventional process, the alkaline earth metal salt of aromatic hydroxycarboxylic acid, which is the reaction product, inevitably has problems in oil solubility and storage stability.

It is known to conduct sulfurization of an alkaline earth metal salt of aromatic hydroxycarboxylic acid as a means for overcoming the above-described problems (JP-A-64-29354). If the sulfurization is conducted prior to carboxylation, however, an active portion of the phenol nucleus is consumed by sulfurization, which makes it difficult to conduct carboxylation. The sulfurization after carboxylation, on the other hand, inevitably causes elimination of one portion of the intentionally-introduced carboxyl group owing to the heat required for the sulfurization. This process is therefore accompanied with the problem that when oil solubility and storage stability are improved by sulfurization, the carboxylation ratio of the product largely lowers, leading to a deterioration in the heat stability, particularly, high-temperature cleanability (result of lacquer test) of the product.

SUMMARY OF THE INVENTION

In order to overcome the above-described problems, the present inventors have proceeded with an investigation. As a result, it has been found that the oil solubility and storage stability of an alkaline earth metal salt of aromatic hydroxycarboxylic acid comprising as a starting material a phenol which contains a hydrocarbon side chain having not more than 15 carbon atoms, preferably 9 to 12 carbon atoms, is inexpensive and can be easily recovered by distillation can be improved by adding a higher aliphatic carboxylic acid, higher aliphatic amine or higher aliphatic amide to the reaction product, reaction intermediate or reaction raw materials.

It has also been found that the long-term storage stability of an alkaline earth metal salt of aromatic hydroxycarboxylic acid which comprises as a starting material a phenol containing a hydrocarbon side chain having 15 or more carbon atoms can be improved in the same manner as above.

That is, the present invention, relates to a petroleum additive having excellent storage stability and heat stability, which comprises an alkaline earth metal salt of aromatic hydroxycarboxylic acid containing a higher aliphatic carboxylic acid, higher aliphatic amine or higher aliphatic amide, or a sulfurized mixture thereof.

Furthermore, the present invention relates to a process for improving storage stability, heat stability and viscosity character of a petroleum additive comprising an alkaline earth metal salt of aromatic hydroxycarboxylic acid or a sulfurized mixture thereof, which comprises the following steps:

(A) reacting a raw material mixture comprising a phenol, a dihydric alcohol, and an alkaline earth metal agent which is an oxide or hydroxide of an alkaline earth metal or a mixture thereof having a gram equivalent ratio per said phenol of not more than 0.99;

(B) distilling off water obtained in the above step (A) and said dihydric alcohol until the remaining amount of said dihydric alcohol becomes not more than 0.4 mol per mol of said alkaline earth metal reagent to obtain a distillation bottom substance; and (C) reacting said distillation bottom substance with carbon dioxide, wherein a higher aliphatic carboxylic acid, a higher aliphatic amine or a higher aliphatic amide is added during the above steps (A) to (C) or to the final product of said petroleum additive.

In the above process, a sulfurization reaction may be further conducted by adding an element sulfur in an amount of 0.05 to 0.5 mol per mol of said alkaline earth metal reagent during the steps (A) to (C), and water may be present in the step (A).

Moreover, the present invention relates to a lubricating oil or a fuel oil comprising the above petroleum additive.

DETAILED DESCRIPTION OF THE INVENTION

The present invention will hereinafter be described more specifically.

Examples of the phenol for use in the present invention include mono- and di-substituted phenols each containing a hydrocarbon side chain having 8 to 36 carbon atoms, preferably 8 to 18 carbon atoms, more preferably 8 to 15 carbon atoms, and most preferably 9 to 12 carbon atoms, such as an alkyl group, an alkenyl group and an aralkyl group. Specific examples thereof include phenols each containing a hydrocarbon group (e.g., octyl, nonyl, dodecyl, cetyl, octadecyl) or a group derived from petroleum hydrocarbon (e.g., liquid paraffin, wax, olefin polymer (polyethylene, polypropylene, polybutene or the like). They are used alone or as a mixture of two or more thereof. It is preferred to use a phenol which can generally take a liquid form at about 130° C., preferably about 120° C. More specific examples thereof include octylphenol, nonylphenol, dodecylphenol, cetylphenol, octadecylphenol, alkylphenol alkylated with polybutene and dialkylphenol.

In the present invention, the amount used of an element sulfur for use in the sulfurizing reaction is limited to an amount less than that of an alkaline earth metal reagent. More specifically, the element sulfur is used in an amount of 0.05 to 0.5 mol, preferably 0.1 to 0.4 mol, and more preferably 0.15 to 0.3 mol, per mol of the alkaline earth metal reagent. Amounts smaller than the above range cause a reduction in the sulfide content of the product, whereby the viscosity of the product does not lower sufficiently, resulting in the deterioration of the effect for improving oil solubility and storage stability. In this case, it is therefore necessary to increase the amount of a higher aliphatic carboxylic acid, higher aliphatic amine or higher aliphatic amide. When the amount is larger than the above range, on the other hand, a decrease in the carboxylation ratio caused by the sulfurizing reaction becomes eminent and heat resistance of the product (result of lacquer test) lowers.

Examples of the higher aliphatic carboxylic acid to be added include saturated or unsaturated, linear or branched aliphatic carboxylic acids having 16 to 36 carbon atoms, preferably 18 to 36 carbon atoms, and more preferably 18 to 24 carbon atoms. Specific examples thereof include palmitic acid, stearic acid, eicosanoic acid, docosanoic acid (behenic acid), tetracosanoic acid, oleic acid, linoleic acid, linolenic acid and erucic acid. Among them, a saturated aliphatic carboxylic acid is preferred because it has good stability. On the other hand, a linear aliphatic carboxylic acid is also preferred in view of availability.

The higher aliphatic carboxylic acid is used in an amount of 0.05 to 1.0 mol, preferably 0.07 to 1.0 mol, more preferably 0.07 to 0.8 mol, and most preferably 0.07 to 0.5 mol, per mol of the alkaline earth metal reagent.

Examples of the higher aliphatic amine to be added include saturated or unsaturated, linear or branched aliphatic amines having 16 to 36 carbon atoms, preferably 16 to 30 carbon atoms, and more preferably 16 to 24 carbon atoms. Among them, a saturated aliphatic amine is preferably used because of good stability. When the availability is taken into consideration, a linear aliphatic amine is used desirably. The term "aliphatic amine" as used herein means any one of primary amine, secondary amine and tertiary amine, with the primary amine being preferred. Specific examples thereof include hexadecylamine, stearylamine (octadecylamine), eicosylamine and docosylamine.

The higher aliphatic amine is used in an amount of 0.05 to 1.0 mol, preferably 0.07 to 1.0 mol, more preferably 0.07 to 0.8 mol, and most preferably 0.07 to 0.5 mol, per mol of the alkaline earth metal reagent.

Examples of the higher aliphatic amide to be added include saturated or unsaturated, linear or branched aliphatic amides having 16 to 36 carbon atoms, preferably 16 to 30 carbon atoms, and more preferably 16 to 24 carbon atoms. Among them, a saturated aliphatic amide is preferred because it has good stability. From the viewpoint of the availability, on the other hand, a linear aliphatic amide is preferably employed. The term "aliphatic amide" as used herein means a compound in which one of the hydrogen atoms of ammonia has been substituted with the acyl group of an aliphatic carboxylic acid. Specific examples thereof include palmitic acid amide, oleic acid amide, stearic acid amide, erucic acid amide and behenic acid amide.

The higher aliphatic amide is used in an amount of 0.05 to 1.0 mol, preferably 0.07 to 1.0 mol, more preferably 0.07 to 0.8 mol, and most preferably 0.07 to 0.5 mol, per mol of the alkaline earth metal reagent.

When the amount of the above-described higher aliphatic carboxylic acid, higher aliphatic amine or higher aliphatic amide is less than 0.05 mol per mol of the alkaline earth metal reagent, an improving effect of it for storage stability lowers. Amounts exceeding 1.0 mol sometimes bring about an adverse effect such as incomplete dissolution and precipitation of the compound and in addition, they happen to induce a rise in the product cost. Such amounts outside the above range are therefore not preferred.

As an alkaline earth metal reagent to be used for the reaction, alkaline earth metal salts, alcoholates of an alkaline earth metal can be used. From the economical viewpoint, oxides or hydroxides of an alkali earth metal are generally employed. Examples thereof include oxides and hydroxides of calcium, barium, strontium or magnesium. The alkaline earth metal reagent is added in an amount of 0.99 equivalent or smaller, preferably 0.1 to 0.98 equivalent, and more preferably 0.2 to 0.98 equivalent, per equivalent of the raw material phenol.

When the amount of the alkaline earth metal reagent is too great relative to the phenol, the intermediate gels and the reaction does not proceed further so that the intended product having good properties cannot be obtained. When the amount is too small, the yield of the product relative to the raw material lowers and is therefore economically disadvantageous.

The dihydric alcohol to be used for the reaction is selected from those having a relatively low boiling point and low viscosity and being rich in reactivity can be used. The dihydric alcohols preferably have 2 to 6 carbon atoms, and ethylene glycol and propylene glycol are particularly preferred. The dihydric alcohol assists the conversion into an oil-soluble substance upon the reaction between a phenol and an alkaline earth metal reagent and stabilizes the thus obtained substance. A very small portion of the dihydric alcohol remains in the product. In the present invention, the metal addition reaction may be conducted by adding water having a reaction accelerating effect or without water.

When water is not added, the dihydric alcohol is suitably added in an amount of about 0.15 to 3.0 mol, preferably about 0.5 to 2.0 mol, per mol of the alkaline earth metal reagent.

When water is added, on the other hand, the dihydric alcohol is suitably added in an amount of about 0.15 to 2.0 mol, preferably about 0.5 to 1.4 mol, per mol of the alkaline earth metal reagent.

Amounts of the dihydric alcohol smaller than the above range inevitably lower the conversion ratio of the reaction raw materials, particularly, the alkaline earth metal reagent into the product. When the amount is greater than the above range, on the other hand, the metal addition reaction proceeds smoothly but it requires additional time and utilities to distill off the excess dihydric alcohol from the reaction product.

In the metal addition reaction step of an alkaline earth metal reagent to a phenol, when water is added to the reaction system to promote the reaction, not only distilled water but also canned water, industrial water or water formed by the metal addition reaction can be used. Its quality is not particularly limited. Water in any state such as cool water, warm water or steam can be used. Upon the addition of water used for the promotion of the metal addition reaction to a reactor, water may be added alone or after one or whole portion thereof is mixed with another material such as the dihydric alcohol or a higher alcohol which will be described later. No particular limitation is imposed on the adding time of water to the reactor. Water may be added either after or before all the reaction materials except water are mixed, however, it is preferred to add water within about one hour after the mixture of all the reaction raw materials.

For the promotion of the metal addition reaction, water is added to the reaction system in an amount of about 0.01 to 10 mol, preferably 0.05 to 2.0 mol, and more preferably 0.05 to 1.0 mol, per mol of the alkaline earth metal reagent to be used. When water is added to the reaction system from outside to conduct metal addition reaction, the reaction proceeds smoothly compared with the case where the reaction is conducted under similar conditions except for the addition of water. In this case, the conversion ratio of the reaction materials, particularly, the alkaline earth metal reagent, into the product becomes high even if the mixing ratio of the dihydric alcohol is decreased. Accordingly, the addition of water makes it possible to reduce the amount of the dihydric alcohol, thereby shortening the distillation time of the dihydric alcohol after the reaction. In the case where the dihydric alcohol is added in a small amount, the addition of water to the reaction system in an excessively small amount reduces the conversion ratio of the alkaline earth metal reagent into the product. The addition of water in an excessively great amount, on the other hand, increases time and utilities spent for the distillation of water after reaction, which is not economical.

In the present invention, it is possible to add a diluent or solvent having a suitable viscosity (which will hereinafter referred to as a "diluent", collectively) in order to facilitate the dealing of the reaction product, reaction intermediate or product. The reaction may be conducted in the presence of the diluent. Preferable examples thereof include petroleum fractions each having a suitable viscosity, for example, paraffin type, naphthene type, aromatic type and mixed type base oils. A lubricating oil fraction having a boiling point of about 220 to 550° C. and having a viscosity of about 0.5 to 40 mm$^2$/s at 100° C. can be given as a specific example. Any organic solvent can be used insofar as it has both hydrophobic property and lipophilic property and is harmless at the time of reaction or when used for various applications as a final product. For example, high alcohols having 8 to 24 carbon atoms can be employed.

Main preparation steps and operation conditions of the alkaline earth metal salt of an aromatic hydroxycarboxylic acid or its sulfurized mixture are as described below.

(i) Metal addition step

A mixture of reaction raw materials comprising a phenol, a dihydric alcohol, an alkaline earth metal reagent and optionally water, each in a predetermined amount, is allowed to react at a reaction temperature of 60 to 200° C., preferably about 90 to 190° C. At that time, the reaction is conducted in an inert gas atmosphere and under the conditions of a reduced pressure, a normal pressure or a pressure of about 1 to 1000 kPa. In this specification, the pressure is indicated by an absolute pressure unless otherwise indicated.

It is most preferred that the raw materials are charged to a reactor in the following order so that the reaction will proceed smoothly.

An alkaline earth metal salt is charged after the charge of a phenol, followed by the addition of a dihydric alcohol and water.

Concerning water formed in the above metal addition reaction step and water added from outside, about at least 90%, preferably about at least 99.9%, more preferably the whole amount of water is distilled off. The dihydric alcohol is, on the other hand, distilled off so that the remaining amount of it in the system will be generally about not more than 0.4 mol, preferably about not more than 0.3 mol, more preferably about not more than 0.2 mol, per mol of the metal of the salt of a phenol. Great remaining amounts of water and dihydric alcohol in the system lower the carboxylation ratio in the subsequent carboxylation step, thereby decreasing the preparation amount of hydroxycarboxylic acid. In general, this reaction is substantially completed within about 1 to 9 hours.

Incidentally, it is also possible to carry out the sulfurization step, which will be described later, at the same time. In such a case, similar to the alkaline earth metal reagent, the element sulfur is charged after the phenol, followed by the addition of the divalent alcohol and water.

(ii) Carboxylation step

In this step, the above-described product of the metal addition reaction or a sulfurized mixture thereof is carboxylated to form a hydroxycarboxylic acid component. Specifically, the alkaline earth metal salt of a phenol or a sulfurized mixture thereof is allowed to react with carbon dioxide at a reaction temperature of about 150 to 240° C., preferably about 160 to 230° C., under the conditions of a reduced pressure, a normal pressure or a pressure of about 5 to 10000 kPa, preferably about 10 to 5000 kPa, and more preferably 100 to 5000 kPa. In general, this reaction is substantially completed within about 1 to 10 hours.

Incidentally, upon reacting the alkaline earth metal salt of a phenol with carbon dioxide, when water and a dihydric alcohol exist in the reaction system, it is necessary to react with carbon dioxide after the removal of large portions of the water and dihydric alcohol, preferably the whole amount of the water and a large portion of the dihydric alcohol. Greater remaining amounts of water and dihydric alcohol in the system lower the carboxylation ratio, thereby decreasing the preparation amount of hydroxycarboxylic acid.

In this step, it is also possible to conduct the sulfurization step, which will be described later, at the same time. In such a case, the element sulfur can be added either before or after the blowing of carbon dioxide is started, but it is preferred to add it about one hour before the completion of this carboxylation step.

(iii) Sulfurization step

This sulfurization step is an optional step for the improvement of the physical properties of the final product such as oil solubility, storage stability and viscosity characteristics. In this step, the product obtained by the above carboxylation step is allowed to react at a temperature of 160 to 200° C., preferably 160 to 190° C., in a carbon dioxide or an inert gas atmosphere under the conditions of a reduced pressure, a normal pressure or a pressure of about 5 to 10000 kPa, preferably about 10 to 5000 kPa, and more preferably 100 to 5000 kPa. In general, this reaction is substantially completed within about 1 to 20 hours. In the case where the element sulfur has already been added and the sulfurization reaction is effected upon the metal addition step or carboxylation step, it is not necessary to conduct this sulfurization step here.

Incidentally, the reaction may be repeated for the unreacted phenol. In such a case, the step of (i) from which the adding step of a phenol is removed, the step of (ii) and optionally the step of (iii) are repeated.

The unreacted phenol in the reaction product after the carboxylation reaction may be recovered if necessary. Generally, it is recovered by distillation or the like. In a principal embodiment which is intended by the present invention, the hydrocarbon side chain of the phenol employed as a raw material has relatively low carbon atoms so that different from a long-chain phenol which has so far been used mainly in the prior art, the unreacted phenol can be distilled and recovered comparatively easily and elimination of the carboxyl group from the product so obtained, which occurs at the time of distillation, can be suppressed eminently. A small amount of remaining insoluble materials can be removed by the operations such as filtration or centrifugal separation.

It is possible to add the higher aliphatic carboxylic acid, higher aliphatic amine or higher aliphatic amide at any time of around step (i), around step (ii) and around step (iii), or after the removal of the insoluble matter.

The petroleum additive according to the present invention has generally a base number of 50 to 300 mg KOH/g, preferably 80 to 200 mg KOH/g. The petroleum additive according to the present invention is added to a lubricating oil to give a base number of 5 to 80 mg KOH/g, to a diesel fuel oil in an amount of 0.01 to 0.5 wt %, and to a 2-cycle gasoline fuel in an amount of 0.01 to 1.0 wt %.

According to the present invention, the storage stability and heat stability of the sulfurized mixture of the alkaline earth metal salt of an aromatic hydroxycarboxylic acid can be improved markedly by adding a higher aliphatic carboxylic acid, a higher aliphatic amine or a higher aliphatic amide to the reaction raw materials, reaction intermediate or reaction product and sulfurizing the resulting mixture by a small amount of sulfur. In particular, the present invention is characterized by that no limitation is imposed on the adding time of the sulfur insofar as the addition is conducted during the reaction steps. Moreover, since the raw material phenol containing an alkyl side chain having relatively low carbon atoms can be employed, the unreacted phenol can be recovered easily by distillation. This method is more effective when an industrially general-purpose phenol containing a hydrocarbon side chain having not more than 12 carbon atoms is used as a raw material. This method is therefore economical.

The present invention will hereinafter be described more specifically by the following examples. It should however be borne in mind that these examples are intended to be purely exemplary of the present invention and do not limit the invention.

EXAMPLE 1

In a 1-liter autoclave equipped with a stirrer, a condenser, a nitrogen gas inlet tube and a thermometer, 393 g (1.49 mol) of dodecylphenol (p-dodecylphenol content; 93.42%, o-dodecylphenol content; 6.33%), 41.38 g (0.7 mol) of calcium oxide having a purity of 94.9% and 196.4 g of 150 neutral oil (a paraffin type lubricating oil having a viscosity at 100° C. of 5.27 mm$^2$/s) were charged, followed by stirring. To the suspension so obtained, a mixed solution composed of 58.68 g (0.945 mol) of ethylene glycol and 1.26 g (0.07 mol) of water was added at 130° C. under the pressure of 200 kPa in a nitrogen gas stream, followed by reaction at 300 kPa and 130° C. for 3 hours. While the pressure of the reaction system was reduced gradually, 13.86 g of the water formed and added and 59.83 g of a mixture composed of a large portion of the ethylene glycol added and a small amount of dodecylphenol were then distilled off, whereby 617.0 g of the distillation residue in a mustard color was obtained in the liquid form. At that time, the temperature of the bottom substance was 184° C., while the temperature of the distillate was 129° C. (0.3 kPa).

Carbon dioxide was then blown into 612.9 g of the distillation residue at 178° C. and 8 kPa, whereby the pressure was raised up to 500 kPa. The pressure-raised condition was maintained as it was for 4 hours, whereby 641.3 g of the reaction product in a dark gray-yellowish red color was obtained in the liquid form.

To a 1-liter three-necked pear-type flask, 557.4 g of the reaction product thus obtained was transferred, followed by distillation under reduced pressure in order to recover the unreacted portion of dodecylphenol. A mixture (173.5 g) of dodecylphenol and a fraction of a lubricating oil was distilled off, whereby 383.9 g of the distillation residue was obtained.

At that time, the temperature of the bottom substance was 220° C., while that of the distillate was 182° C. (0.3 kPa).

From the reaction product, 1.69 g of the insoluble substance was removed by filtration, whereby 378.4 g of the substance in a dark brown color was obtained in the form of a transparent and viscous liquid (Filtrate A). The properties of Filtrate A are shown in Table 1.

To 50 g of Filtrate A, 2.72 g (0.008 mol) of docosanoic acid was added, that is, docosanoic acid was added in an amount of 0.1 mol per mol of the alkaline earth metal reagent, followed by stirring at 150° C. for one hour, whereby 52.72 g of the final product was obtained in the form of a viscous liquid.

To the final product thus obtained, an oil corresponding to SAE No. 50 was added, whereby 30 g of the oil diluted to give a base number of 78 mg KOH/g was prepared. A change of the external appearance of the oil thus obtained was observed with the passage of time (storage stability test). The results are shown in Table 2.

EXAMPLE 2

To 50 g of Filtrate A, which was an intermediate product obtained in Example 1, 2.16 g (0.008 mol) of stearylamine were added, that is, stearylamine was added in an amount of 0.1 mol per mol of the alkaline earth metal reagent, followed by stirring at 150° C. for one hour, whereby 52.16 g of the final product was obtained in the form of a viscous liquid.

To the final product so obtained, an oil corresponding to SAE No. 50 was added, whereby 30 g of the oil diluted to give a base number of 78 mg KOH/g was prepared. A change in the external appearance of the oil was observed with the passage of time. The results are shown in Table 2.

EXAMPLE 3

To 50 g of Filtrate-A, which was an intermediate product obtained in Example 1, 2.27 g (0.008 mol) of stearic acid amide was added, that is, stearic acid amide was added in an amount of 0.1 mol per mol of the alkaline earth metal reagent, followed by stirring at 150° C. for one hour, whereby 52.27 g of the final product was obtained in the form of a viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 2.

EXAMPLE 4

In a 1-liter autoclave equipped with a stirrer, a condenser, a nitrogen gas inlet tube and a thermometer, 484.4 g (1.4 mol) of octadecylphenol (p-octadecylphenol content: 90.00%, o-octadecylphenol content: 9.71%), 35.47 g (0.6 mol) of calcium oxide having a purity of 94.9% and 168.3 g of 150 neutral oil (a paraffin type lubricating oil having a viscosity at 100° C. of 5.27 mm²/s) was charged, followed by stirring. To the suspension so obtained, a mixed solution composed of 50.30 g (0.81 mol) of ethylene glycol and 1.08 g (0.06 mol) of water was added at 130° C. under pressure of 200 kPa in a nitrogen gas stream. The resulting mixture was allowed to react at 300 kPa and 130° C. for 3 hours. While pressure reduction of the reaction system was conducted gradually, 11.88 g of the water formed and added and 53.83 g of a mixture containing a large proportion of the ethylene glycol added and a small amount of octadecylphenol were distilled off, whereby 673.8 g of the distillation residue in a mustard color was obtained in the liquid form. At that time, the temperature of the bottom substance was 184° C., while the temperature of the distillate was 129° C. (0.3 kPa).

Carbon dioxide was then blown into 671.1 g of the distillation residue at 178° C. and 8 kPa, whereby the pressure was raised up to 502 kPa. The pressure-raised condition was maintained as it was for 4 hours, whereby 697.5 g of the reaction product in a dark gray-yellowish red color was obtained in the liquid form.

From the reaction product, 3.54 g of the insoluble substance was removed by filtration, whereby 692.2 g of the substance in a dark brown color was obtained in the form of a transparent and viscous liquid (Filtrate B). The properties of Filtrate B are shown in Table 1.

To 50 g of Filtrate B, 2.72 g (0.008 mol) of docosanoic acid was added, that is, docosanoic acid was added in an amount of 0.1 mol per mol of the alkaline earth metal reagent, followed by stirring at 150° C. for one hour, whereby 52.72 g of the final product was obtained in the form of a viscous liquid.

To the final product thus obtained, an oil corresponding to SAE No. 50 was added, whereby 30 g of the oil diluted to give a base number of 78 mg KOH/g was prepared. A Change of its external appearance of the oil thus obtained was observed with the passage of time. The results are shown in Table 2.

TABLE 1

| Properties | Filtrate A | Filtrate B |
| --- | --- | --- |
| Kinematic viscosity 100° C. (mm²/s) | 166.3 | 22.5 |
| (1) Calcium (wt %) | 6.25 | 3.30 |
| Base number (mg KOH/g) (perchloric acid method) | 175 | 92 |
| Acid number (mg KOH/g) | 53 | 35 |
| (2) COOH/Ca (mol/mol)*¹ | 0.6057 | 0.7610 |
| Free phenols (wt %) | 4.03 | 36.15 |
| Whole phenol nucleus (wt %) | 54.08 | 69.43 |
| (3) Metal added phenol nucleus (wt %) | 50.05 | 33.28 |
| Calcium/metal-added phenol nucleus (mol/mol)*² | 0.8166 | 0.8571 |
| Carboxyl group/metal-added phenol nucleus (mol/mol)*³ | 0.4948 | 0.6522 |

*¹amount of carboxylic acid per calcium calculation formula: (acid number/base number) × 2
*²calculation formula: [(1)/M-Ca]/[(3)/M-P]
*³calculation formula: [(1)/M-Ca] × (2)/[(3)/M-P]
M-Ca: Atomic weight of calcium
M-P: Molecular weight of phenols

EXAMPLE 5

In a 1-liter autoclave equipped with a stirrer, a condenser, a nitrogen gas inlet tube and a thermometer, 393 g (1.49 mol) of dodecylphenol (p-dodecylphenol content: 93.42%, o-dodecylphenol content: 6.33%), 41.38 g (0.7 mol) of calcium oxide having a purity of 94.9% and 196.4 g of 150 neutral oil (a paraffin-type lubricating oil having a viscosity at 100° C. of 5.27 mm²/s) were charged, followed by stirring. To the suspension thus obtained, a mixed solution of 56.82 g (0.915 mol) of ethylene glycol and 1.26 g of water (0.07 mol) was added at 130° C. under the pressure of 200 kPa in a nitrogen gas stream. The resulting solution was reacted at 130° C. and 300 kPa for 3 hours. While the pressure of the reaction system was reduced gradually, 13.77 g of the water formed and 59.06 g of a mixture composed of a large portion of the ethylene glycol added and a small amount of dodecylphenol were distilled off, whereby 616.0 g of the distillation residue in a mustard color was obtained in the liquid form. At that time, the temperature of the bottom substance was 182° C., while that of the distillate was 136° C. (0.3 kPa).

To 616.0 g of the distillation residue, 23.84 g (0.07 mol) of docosanoic acid was added. Carbon dioxide was then blown into the resulting mixture at 178° C. and 8 kPa, and the pressure was raised up to 500 kPa. The pressure-raised condition was maintained as it was for 4 hours, whereby 668.6 g of the reaction product in a dark gray-yellowish red color was obtained in the liquid form.

From the reaction product, 2.06 g of the insoluble substances was removed by filtration, whereby 662.4 g of the final product in a dark brown color was obtained in the form of a transparent and viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 2.

EXAMPLE 6

In a 1-liter autoclave equipped with a stirrer, a condenser, a nitrogen gas inlet tube and a thermometer, 393 g (1.49 mol) of dodecylphenol (p-dodecylphenol content: 93.42%, o-dodecylphenol content: 6.33%), 41.38 g (0.7 mol) of calcium oxide having a purity of 94.9%, 196.4 g of 150 neutral oil (a paraffin-type lubricating oil having a viscosity at 100° C. of 5.27 mm$^2$/s) and 18.87 g (0.07 mol) of stearylamine were charged, followed by stirring. To the suspension so obtained, 74.52 g (1.2 mol) of ethylene glycol were added at 130° C. under the pressure of 200 kPa in a nitrogen gas stream. The resulting solution was allowed to react at 130° C. and 300 kPa for 3 hours. While the pressure of the reaction system was reduced gradually, 12.6 g of the water formed and 77.02 g of a mixture composed of a large portion of the ethylene glycol added and a small amount of dodecylphenol were distilled off, whereby 634.6 g of the distillation residue in a mustard color was obtained in the liquid form. At that time, the temperature of the bottom substance was 181° C., while that of the distillate was 132° C. (0.3 kPa).

Carbon dioxide was then blown into 630.8 g of the distillation residue at 178° C. and 8 kPa, whereby the pressure was raised up to 500 kPa. The pressure-raised condition was maintained as it was for 4 hours, whereby 660.2 g of the reaction product in a dark gray-yellowish red color was obtained in the liquid form.

From the reaction product, 2.13 g of the insoluble substance was removed by filtration, whereby 655.4 g of the final product in a dark brown color was obtained in the form of a transparent and viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 2.

Comparative Example 1

To 50 g of Filtrate A, which was an intermediate product obtained in Example 1, an oil corresponding to SAE No. 50 was added, whereby 30 g of the oil diluted to give a base number of 78 mg KOH/g was prepared. A change in the external appearance of the oil was observed with the passage of time. The results are shown in Table 2.

Comparative Example 2

To 50 g of Filtrate A, which was an intermediate product obtained in Example 1, 2.88 g (0.008 mol) of an stearic acid anilide were added, in other words, stearic acid anilide was added in an amount of 0.1 mol per mol of the alkaline earth metal reagent. The resulting mixture was stirred at 150° C. for one hour, whereby 52.88 g of the final product was obtained in the form of a viscous liquid.

To the final product thus obtained, an oil corresponding to SAE No. 50 was added, whereby 30 g of the oil diluted to give a base number of 78 mg KOH/g were prepared. A change in the external appearance of it was observed with the passage of time. The results are shown in Table 2.

Comparative Example 3

To 50 g of Filtrate A, which was an intermediate product obtained in Example 1, 4.86 g (0.008 mol) of calcium stearate were added, in other words, calcium stearate was added in an amount of 0.1 mol per mol of an alkaline earth metal reagent. The resulting mixture was stirred at 150° C. for one hour, whereby 54.86 g of the final product was obtained in the form of a viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 2.

Comparative Example 4

To 50 g of Filtrate B, which was an intermediate product obtained in Example 4, an oil corresponding to SAE No. 50 was added, whereby 30 g of the oil diluted to give a base number of 78 mg KOH/g was prepared. A change in the external appearance of it was observed with the passage of time. The results are shown in Table 2.

TABLE 2

|  | On the day | next day | 1 week later | 2 weeks later | 3 weeks later | 4 weeks later | 2 months later | 3 months later | 4 months later |
| --- | --- | --- | --- | --- | --- | --- | --- | --- | --- |
| Example 1 | A | A | A | A | A | A | A | A | A |
| Example 2 | A | A | A | A | A | A | A | A | A |
| Example 3 | A | A | A | A | A | A | A | A | A |
| Example 4 | A | A | A | A | A | A | A | A | A |
| Example 5 | A | A | A | A | A | A | A | A | A |
| Example 6 | A | A | A | A | A | A | A | A | A |
| Comp. Ex. 1 | A | B | B | B | B | B | B | B | B |
| Comp. Ex. 2 | A | B | B | B | B | B | B | B | B |
| Comp. Ex. 3 | A | B | B | B | B | B | B | B | B |
| Comp. Ex. 4 | A | A | A | A | A | A | A | B | B |

A: Clean external appearance
B: External appearance with turbidity, decomposition and/or film As shown in the results of the storage stability test in Table 2, samples obtained in Examples 1 to 6 according to the present invention have more excellent storage stability than the samples obtained in Comparative Examples 1 to 4.

Particularly, the sample using as a raw material a phenol containing a hydrocarbon side chain having not less than 12 carbon atoms is effective.

EXAMPLE 7

In a 1-liter autoclave equipped with a stirrer, a condenser, a nitrogen gas inlet tube and a thermometer, 393 g (1.49 mol) of dodecylphenol (p-dodecylphenol content: 93.42%, o-dodecylphenol content: 6.33%), 41.35 g (0.7 mol) of calcium oxide having a purity of 94.9% and 196.4 g of 150 neutral oil (a paraffin type lubricating oil having a viscosity at 100° C. of 5.27 mm$^2$/s) were charged, followed by stirring. To the suspension so obtained, a mixed solution of 58.66 g (0.945 mol) of ethylene glycol and 1.25 g (0.07 mol) of water was added at 130° C. under the pressure of 200 kPa in a nitrogen gas stream, followed by reaction at 300 kPa and 130° C. for 3 hours. While the pressure of the reaction system was reduced gradually, a mixture containing 13.90 g of the water formed and added and 60.14 g of a mixture composed of a large portion of the ethylene glycol added and a small amount of dodecylphenol were then distilled off, whereby 616.72 g of the distillation residue in a mustard color was obtained in the liquid form. At that time, the temperature of the bottom substance was 180° C., while that of the distillate was 141° C. (0.3 kPa).

Carbon dioxide was then blown into 616.72 g of the distillation residue at 178° C. and 8 kPa, whereby the pressure was raised up to 500 kPa. The pressure-raised condition was maintained as it was for 4 hours, whereby 647.52 g of the reaction product in a dark gray-yellowish red color was obtained in the liquid form.

To 647.52 g of the reaction product so obtained, 4.49 g (0.14 mol corresponding to 0.2 mol per mol of the alkaline earth metal reagent) of sulfur was added, followed by heating up to 178° C. Then, the pressure was raised up to 500 kPa by using carbon dioxide and the pressure-raised condition was maintained for 4 hours as it was. Then the hydrogen sulfide gas formed was removed, whereby 650.44 g of the reaction product in a dark gray-yellowish red color was obtained in the liquid form.

To a 1-liter three-necked pear-type flask, 557.9 g of the reaction product thus obtained was transferred, followed by distillation under reduced pressure in order to recover the unreacted portion of dodecylphenol. A mixture (161.2 g) of dodecylphenol and a fraction of a lubricating oil were distilled off, whereby 396.2 g of the distillation residue was obtained. At that time, the temperature of the bottom substance was 220° C., while that of the distillate was 182° C. (0.3 kPa).

From the reaction product, 1.56 g of the insoluble matter was removed by filtration, whereby 388.4 g of the substance in a dark brown color was obtained in the form of a transparent and viscous liquid (Filtrate C). The properties of Filtrate C are shown in Table 3.

To 50 g of Filtrate C, which was 2.60 g (0.0076 mol) of docosanoic acid was added, that is, docosanoic acid was added in an amount of 0.1 mol per mol of the alkaline earth metal reagent. The resulting mixture was then stirred at 150° C. for one hour, whereby 52.60 g of the final product was obtained in the form of a viscous liquid.

To the final product thus obtained, an oil corresponding to SAE No. 50 was added, whereby 30 g of the oil diluted to give a base number of 78 mg KOH/g was prepared. A change of the external appearance of the oil was observed with the passage of time (storage stability test). The results are shown in Table 5.

EXAMPLE 8

To 50 g of Filtrate C, which was an intermediate product obtained in Example 7, 2.05 g (0.0076 mol) of stearylamine was added, in other words, stearylamine was added in an amount of 0.1 mol per mol of the alkaline earth metal reagent, followed by stirring at 150° C. for one hour, whereby 52.05 g of the final product was obtained in the form of a viscous liquid.

To the final product thus obtained, an oil corresponding to SAE No. 50 was added, whereby 30 g of the oil diluted to give a base number of 78 mg KOH/g was prepared. A change in the external appearance of the oil was then observed with the passage of time. The results are shown in Table 5.

EXAMPLE 9

To 50 g of Filtrate C, which was an intermediate product obtained in Example 7, 2.15 g (0.0076 mol) of stearic acid amide was added, in other words, stearic acid amide was added in an amount of 0.1 mol per mol of the alkaline earth metal reagent, followed by stirring at 150° C. for one hour, whereby 52.15 g of the final product was obtained in the form of a viscous liquid.

To the final product thus obtained, an oil corresponding to SAE No. 50 was added, whereby 30 g of the oil diluted to give a base number of 78 mg KOH/g was prepared. A change

15 in the external appearance of the oil was observed with the passage of time. The results are shown in Table 5.

EXAMPLE 10

In a 1-liter autoclave equipped with a stirrer, a condenser, a nitrogen gas inlet tube and a thermometer, 484.4 g (1.4 mol) of octadecylphenol (p-octadecylphenol content: 90.00%; o-octadecylphenol content: 9.71%), 35.48 g (0.6 mol) of calcium oxide having a purity of 94.9% and 168.3 g of 150 neutral oil (a paraffin type lubricating oil having a viscosity at 100° C. of 5.27 mm$^2$/s) were charged, followed by stirring. To the suspension thus obtained, a mixture composed of 50.32 g (0.81 mol) of ethylene glycol and 1.07 g (0.06 mol) of water was added at 130° C. under pressure of 200 kPa in a nitrogen gas stream. The resulting mixture was allowed to react at 300 kPa and 130° C. for 3 hours. While pressure reduction of the reaction system was conducted gradually, 11.85 g of the water formed and added and 52.83 g of a mixture containing a large portion of the ethylene glycol added and a small amount of octadecylphenol were removed, whereby 674.84 g of the distillation residue in a mustard color was obtained in the liquid form. At that time, the temperature of the bottom substance was 180° C., while the temperature of the distillate was 150° C. (0.3 kPa).

Carbon dioxide was then blown into 674.84 g of the distillation residue at 178° C. and 8 kPa, whereby the pressure was raised to 502 kPa. The pressure-raised condition was maintained as it was for 4 hours, whereby 699.74 g of the reaction product in a dark gray-yellowish red color was obtained in the liquid form.

To 699.74 g of the reaction product, 2.89 g (0.09 mol corresponding to 0.15 mol per mol of the alkaline earth metal reagent) of sulfur was added. The resulting mixture was heated to 178° C., followed by application of pressure up to 500 kPa by using carbon dioxide. The pressure-applied condition was maintained for 4 hours as it was and then hydrogen sulfide gas formed was removed, whereby 701.76 g of the reaction product in a dark gray-yellowish red color was obtained in the liquid form.

From the reaction product, 3.72 g of the insoluble substance was removed by filtration, whereby 693.04 g of the substance in a dark brown color was obtained in the form of a transparent and viscous liquid (Filtrate D). The properties of Filtrate D are shown in Table 3.

To 50 g of Filtrate D, 1.36 g (0.004 mol) of docosanoic acid was added, in other words, docosanoic acid was added in an amount of 0.1 mol per mol of the alkaline earth metal reagent, followed by stirring at 150° C. for one hour, whereby 51.36 g of the final product was obtained in the form of a viscous liquid.

To the final product thus obtained, an oil corresponding to SAE No. 50 was added, whereby 30 g of the oil diluted to give a base number of 78 mg KOH/g was prepared. A change of the external appearance of oil was observed with the passage of time. The results are shown in Table 5.

TABLE 3

| Properties | Filtrate A | Filtrate B |
|---|---|---|
| Kinematic viscosity 100° C. (mm$^2$/s) | 160.7 | 20.2 |
| (a) Calcium (wt %) | 6.07 | 3.21 |
| Base number (mg KOH/g)*$^1$ | 170 | 90 |
| Acid number (mg KOH/g) | 45 | 32 |

TABLE 3-continued

| Properties | Filtrate A | Filtrate B |
|---|---|---|
| (b) COOH/Ca (mol/mol)*$^2$ | 0.5294 | 0.7111 |
| Sulfur content (wt %) | 0.65 | 0.25 |
| Free phenol (wt %) | 5.14 | 36.88 |
| Whole phenol nucleus (wt %) | 55.12 | 70.61 |
| (c) Metal-added phenol nucleus (wt %) | 49.98 | 33.73 |
| Calcium/metal-added phenol nucleus (mol/mol)*$^3$ | 0.7944 | 0.8226 |
| Carboxyl group /metal-added phenol nucleus (mol/mol)*$^4$ | 0.4206 | 0.5849 |

*$^1$perchloric acid method
*$^2$amount of carboxylic acid per calcium calculation formula: (acid number/base number) × 2
*$^3$calculation formula: [(a)/M-Ca]/[(c)/M-P]
*$^4$calculation formula: [(a)/M-Ca] × (b)/[(c)/M-P]
M-Ca: Atomic weight of calcium
M-P: Molecular weight of phenols

EXAMPLE 11

In a 1-liter autoclave equipped with a stirrer, a condenser, a nitrogen gas inlet tube and a thermometer, 497 g (1.89 mol) of dodecylphenol (p-dodecylphenol content: 93.42%, o-dodecylphenol content: 6.33%) and 41.40 g (0.7 mol) of calcium oxide having a purity of 94.9% were charged, followed by stirring. To the suspension thus obtained, a mixed solution of 56.85 g (0.915 mol) of ethylene glycol and 1.25 g of water (0.07 mol) was added at 135° C. under the pressure of 200 kPa in a nitrogen gas stream. The resulting mixture was then allowed to react at 135° C. and 300 kPa for 4 hours. While the pressure of the reaction system was reduced gradually, 13.86 g of the water formed and added and 60.06 g of a mixture composed of a large portion of the ethylene glycol added and a small amount of dodecylphenol were distilled off, whereby 522.54 g of the distillation residue in a mustard color was obtained in the liquid form. At that time, the temperature of the bottom substance was 180° C., while that of the distillate was 145° C. (0.3 kPa).

Carbon dioxide was then blown into 522.54 g of the distillation residue at 178° C. and 8 kPa, whereby the pressure was raised up to 500 kPa. The pressure-raised condition was maintained as it was for 4 hours, whereby 553.1 g of the reaction product in a dark gray-yellowish red color was obtained in the liquid form.

To 553.1 g of the reaction product, 4.49 g (0.14 mol) of sulfur and 39.83 g (0.14 mol) of stearic acid were added. Carbon dioxide was then blown into the resulting mixture at 178° C. and a normal pressure, whereby the pressure was raised up to 500 kPa. The pressure-raised condition was maintained for 4 hours as it was and then hydrogen sulfide gas formed was removed, whereby 596.07 g of the reaction product in a dark gray-yellowish red color was obtained in the liquid form.

To 596.07 g of the reaction product thus obtained, 196.4 g of 150 neutral oil (a paraffin type lubricating oil having a viscosity at 100° C. of 5.27 mm$^2$/s) was added, followed by stirring. To a 1-liter three-necked pear-type flask, 742.47 g of the resulting mixture were transferred, followed by distillation under a reduced pressure in order to recover the unreacted portion of dodecylphenol. A mixture (319.57 g) of dodecylphenol and a fraction of a lubricating oil were distilled off, whereby 422.9 g of the distillation residue was obtained. At that time, the temperature of the bottom substance was 220° C., while the temperature of the distillate was 182° C. (0.3 kPa).

From the reaction product, 1.47 g of the insoluble substance was removed by filtration, whereby 417.4 g of the final product in a dark brown color was obtained in the form of a transparent and viscous liquid. The properties of the final product thus obtained are shown in Table 4.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 5.

EXAMPLE 12

In a 1-liter autoclave equipped with a stirrer, a condenser, a nitrogen gas inlet tube and a thermometer, 552 g (2.1 mol) of dodecylphenol (p-dodecylphenol content: 93.42%, o-dodecylphenol content: 6.33%), 41.38 g (0.7 mol) of calcium oxide having a purity of 94.9% and 4.49 g (0.14 mol) of sulfur were charged, followed by stirring. To the suspension thus obtained, a mixed solution of 60.86 g (0.98 mol) of ethylene glycol and 1.26 g (0.07 mol) of water was added at 135° C. under the pressure of 200 kPa in a nitrogen gas stream. The resulting solution was allowed to react at 135° C. and 300 kPa for 4 hours. After the pressure of the reaction system was reduced gradually and the resulting hydrogen sulfide was removed, 13.86 g of the water formed and added and 64.06 g of a mixture composed of a large portion of the ethylene glycol added and a small amount of dodecylphenol were distilled off, whereby 580.5 g of the distillation residue in a mustard color was obtained in the liquid form. At that time, the temperature of the bottom substance was 182° C., while that of the distillate was 141° C. (0.3 kPa).

To 580.5 g of the distillation residue, 39.83 g (0.14 mol) of stearic acid was added. Carbon dioxide was then blown into the resulting mixture at 178° C. and 8 kPa, whereby the pressure was raised up to 500 kPa. The pressure-raised condition was maintained as it was for 4 hours, whereby 650.4 g of the reaction product in a dark gray-yellowish red color was obtained in the liquid form.

To 650.4 g of the reaction product, 196.4 g of 150 neutral oil (a paraffin-type lubricating oil having a viscosity at 100° C. of 5.27 mm$^2$/s) was added and they were stirred. To a 1-liter three-necked pear-type flask, 796.47 g of the resulting mixture was transferred and distilled off under a reduced pressure to recover the unreacted portion of dodecylphenol. A mixture (359.97 g) of dodecylphenol and a fraction of a lubricating oil was distilled off, whereby 436.5 g of the distillation residue was obtained. At that time, the temperature of the bottom substance was 220° C., while that of the distillate was 182° C. (0.3 kPa).

From the reaction product, 1.47 g of the insoluble substance was removed by filtration, whereby 429.7 g of the final product in a dark brown color was obtained in the form of a transparent and viscous liquid. The properties of the final product are shown in Table 4.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 5.

Comparative Example 5

To 50 g of Filtrate C, which was an intermediate product obtained in Example 7, an oil corresponding to SAE No. 50 was added, whereby 30 g of the oil diluted to give a base number of 78 mg KOH/g was prepared. A change in the external appearance of the oil was observed with the passage of time. The results are shown in Table 5.

Comparative Example 6

To 50 g of Filtrate C, which was an intermediate product obtained in Example 7, 2.89 g (0.008 mol) of stearic acid amide was added, in other words, stearic acid anilide was added in an amount of 0.1 mol per mol of an alkaline earth metal reagent. The resulting mixture was stirred at 150° C. for one hour, whereby 52.87 g of the final product was obtained in the form of a viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 5.

Comparative Example 7

To 50 g of Filtrate C, which was an intermediate product obtained in Example 7, 4.85 g (0.008 mol) of calcium stearate were added, in other words, calcium stearate was added in an amount of 0.1 mol per mol of an alkaline earth metal reagent. The resulting mixture was stirred at 150° C. for one hour, whereby 54.88 g of the final product was obtained in the form of a viscous liquid.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 5.

Comparative Example 8

To 50 g of Filtrate D, which was an intermediate product obtained in Example 10, an oil corresponding to SAE No. 50 was added, whereby 30 g of the oil diluted to give a base number of 78 mg KOH/g was prepared. A change in the external appearance of the oil was observed with the passage of time. The results are shown in Table 5.

Comparative Example 9

In a 1-liter autoclave equipped with a stirrer, a condenser, a nitrogen gas inlet tube and a thermometer, 644 g (2.45 mol) of dodecylphenol (p-dodecylphenol content: 93.42%, o-dodecylphenol content: 6.33%) and 41.38 g (0.7 mol) of calcium oxide having a purity of 94.9% were charged, followed by stirring. To the suspension thus obtained, a mixed solution of 56.82 g (0.915 mol) of ethylene glycol and 1.26 g of water (0.07 mol) was added at 135° C. under the pressure of 200 kPa in a nitrogen gas stream. The resulting mixture was allowed to react at 135° C. and 300 kPa for 4 hours. While the pressure of the reaction system was reduced gradually, 13.86 g of the water formed and added and 61.06 g of a mixture composed of a large portion of the ethylene glycol added and a small amount of dodecylphenol were distilled off, whereby 668.54 g of the distillation residue in a mustard color was obtained in the liquid form. At that time, the temperature of the bottom substance was 180° C., while that of the distillate was 145° C. (0.3 kPa).

Carbon dioxide was then blown into 668.54 g of the distillation residue at 178° C. and 8 kPa and the pressure was raised up to 500 kPa. The pressure-raised condition was maintained as it was for 4 hours, whereby 698.2 g of the reaction product in a dark gray-yellowish red color was obtained in the liquid form.

To 698.2 g of the reaction product thus obtained, 24.64 g (0.77 mol) of sulfur and 39.83 (0.14 mol) of stearic acid were added. Carbon dioxide was then blown into the resulting solution at 178° C. and a normal pressure, whereby the pressure was raised up to 500 kPa. The pressure raised-condition was maintained as it was for 4 hours. The resulting hydrogen sulfide was removed, whereby 754.05 g of the reaction product in a dark gray-yellowish red color was obtained in the liquid form.

To 754.05 g of the reaction product, 196.4 g of 150 neutral oil (a paraffin type lubricating oil having a viscosity at 100° C. of 5.27 mm²/s) was added, followed by stirring. To a 1-liter three-necked pear-type flask, 850.99 g of the resulting mixture thus obtained was transferred, followed by distillation under a reduced pressure in order to recover the unreacted portion of dodecylphenol. A mixture (425.09 g) of dodecylphenol and a fraction of a lubricating oil was distilled off, whereby 425.9 g of the distillation residue was obtained. At that time, the temperature of the bottom substance was 220° C., while the temperature of the distillate was 182° C. (0.3 kPa).

From the reaction product, 1.96 g of the insoluble substance was then removed by filtration, whereby 418.7 g of the final product in a dark brown color was obtained in the form of a transparent and viscous liquid. The properties of the final product thus obtained are shown in Table 4.

To the final product thus obtained, an oil corresponding to SAE No. 50 was added, whereby 30 g of the oil diluted to give a base number of 78 mg KOH/g was prepared. A change in the external appearance of the oil was observed with the passage of time. The results are shown in Table 5.

TABLE 4

| Properties | Ex. 10 | Ex. 11 | Comp. Ex. 9 |
|---|---|---|---|
| Kinematic viscosity 100° C. (mm²/s) | 223.4 | 253.7 | 176 |
| Calcium (wt %) | 6.25 | 6.07 | 5.93 |
| Base number (mg KOH/g)*¹ | 175 | 170 | 166 |
| Acid number (mg KOH/g) | 65 | 62 | 42 |
| COOH/Ca (mol/mol)*² | 0.7429 | 0.7294 | 0.5060 |
| Sulfur content (wt %) | 0.64 | 0.60 | 3.37 |

*¹perchloric acid method
*²amount of carboxylic acid per calcium, calculation method: (acid number/base number) × 2

TABLE 5

| | On the day | 1 week later | 1 month later | 2 months later | 3 months later |
|---|---|---|---|---|---|
| Example 7 | A | A | A | A | A |
| Example 8 | A | A | A | A | A |
| Example 9 | A | A | A | A | A |
| Example 10 | A | A | A | A | A |
| Example 11 | A | A | A | A | A |
| Example 12 | A | A | A | A | A |
| Comp. Ex. 5 | A | B | B | B | B |
| Comp. Ex. 6 | A | B | B | B | B |
| Comp. Ex. 7 | A | B | B | B | B |
| Comp. Ex. 8 | A | A | A | A | B |
| Comp. Ex. 9 | A | A | A | A | A |

A: clean external appearance
B: external appearance with turbidity, decomposition and/or film As shown in the results of the storage stability test in Table 5, samples obtained in Examples 7 to 12 according to the present invention have more excellent storage stability than those obtained in Comparative Examples 5 to 8. When the sample using as a raw material a phenol containing a hydrocarbon side chain having not more than 12 carbon atoms is used, the present invention is particularly effective.

In the next place, properties of the samples obtained in Examples 11 and 12 are compared with that obtained in Comparative Example 9 (see Table 4).

As shown in Table 4, compared with the sample obtained in Comparative Example 9 in which a larger amount of sulfur was used in the sulfurization step, the samples obtained according to the present invention have a markedly high carboxylation ratio.

Next, samples obtained in Examples 11 and 12 are compared with that obtained in Comparative Example 9 in heat resistance.

Heat-resistance test

For evaluation of the heat resistance of the samples obtained in Examples 11 and 12 and Comparative Example 9, a hot tube test (lacquer test) and panel caulking test were conducted. The results are shown in Tables 6 and 7. The sample was provided for use after diluted with 500 neutral oil (a paraffin type lubricating oil having a kinematic viscosity at 100° C. of 10.96 mm²/S) to give a base number of 10 mg KOH/g.

Results of Heat-resistance test (1)

Hot tube test (lacquer test):

high temperature cleanability in accordance with the method employed by Komatsu Setsubi Co., Ltd.

Testing time:

16 hours, grades of lacquer from 1 to 10 points (the higher the grade, the better the high-temperature cleanability)

TABLE 6

| | Grade | |
|---|---|---|
| | 310° C. | 320° C. |
| Example 11 | 7.0 | 5.0 |
| Example 12 | 7.0 | 4.0 |
| Comp. Ex. 9 | 5.0 | 1.0 |

Results of heat resistance test (2)

Panel caulking test:

test on the resistance to carbonization-derived deterioration

Reference literature:

Fed Test Method No. 791B 3462

Testing time:

3 hours, temperature of the panel 330° C., temperature of the oil: 80° C. The amount of the deposit adhered to the panel is indicated (unit: mg, the lower the numerical value, the better the resistance to the carbonization-derived deterioration.

TABLE 7

| | Deposit amount (mg) |
|---|---|
| Example 11 | 12.0 |
| Example 12 | 14.0 |
| Comp. Ex. 9 | 5.0 |

As shown in Tables 6 and 7, the samples obtained in Examples 11 and 12 according to the present invention have more excellent high-temperature cleanability and resistance to carbonization-derived deterioration than that obtained in Comparative Example 9.

The comparison in the properties and performances between the samples obtained in Examples 11 and 12 and that obtained in Comparative Example 9 is shown in Table 8.

TABLE 8

|  | High-temperature cleanability | Resistance to carbonization-derived deterioration | Viscosity characteristics | Storage stability |
|---|---|---|---|---|
| Example 11 | A | A | A | A |
| Example 12 | A | A | A | A |
| Comp. Ex. 9 | B | A | A | A |

A: superior
B: inferior

While the invention has been described in detail and with reference to specific embodiments thereof, it will be apparent to one skilled in the art that various changes and modifications can be made therein without departing from the spirit and scope thereof.

What is claimed is:

1. A petroleum additive having excellent storage stability and heat stability, which comprises an alkaline earth metal salt of an aromatic hydroxycarboxylic acid containing a higher aliphatic carboxylic acid, wherein said higher aliphatic carboxylic acid is contained in an amount of from 0.05 mol to 1.0 mol per mol of the alkaline earth metal contained in said alkaline earth metal salt of an aromatic hydrocarboxylic acid or the sulfurized mixture thereof, a higher aliphatic amine, wherein said higher aliphatic amine is contained in an amount of from 0.05 mol to 1.0 mol per mol of the alkaline earth metal contained in said alkaline earth metal salt of an aromatic carboxylic acid or the sulfurized mixture thereof, a higher aliphatic amide, wherein said higher aliphatic amide is contained in an amount of from 0.05 mol to 1.0 mol per mol of the alkaline earth metal contained in said alkaline earth metal salt of an aromatic carboxylic acid or the sulfurized mixture thereof, wherein said higher aliphatic carboxylic acid has 16 to 36 carbon atoms, said higher aliphatic amine has 16 to 36 carbon atoms and said higher aliphatic amide has 16 to 36 carbon atoms.

2. The petroleum additive according to claim 1, wherein said sulfurized mixture of the alkaline earth metal salt of aromatic hydroxycarboxylic acid has been sulfurized in a ratio of 0.05 mol to 0.5 mol per mol of the alkaline earth metal.

3. The petroleum additive according to claim 1, wherein said alkaline earth metal salt of aromatic hydroxycarboxylic acid or the sulfurized mixture thereof has a hydrocarbon side chain having 8 to 36 carbon atoms.

4. The petroleum additive according to claim 1, wherein said alkaline earth metal salt of aromatic hydroxycarboxylic acid or the sulfurized mixture thereof is essentially free of an alkali metal.

5. The petroleum additive according to claim 1, wherein said higher aliphatic amine is a primary amine.

6. A process for improving storage stability, heat stability and viscosity character of a petroleum additive comprising an alkaline earth metal salt of an aromatic hydroxycarboxylic acid or a sulfurized mixture thereof, which comprises the following steps:

(A) reacting a raw material mixture comprising a phenol, a dihydric alcohol, and an alkaline earth metal agent which is an oxide or hydroxide of an alkaline earth metal or a mixture thereof having a gram equivalent ratio per said phenol of not more than 0.99;

(B) distilling off water obtained in the above step (A) and said dihydric alcohol until the remaining amount of said dihydric alcohol becomes not more than 0.4 mol per mol of said alkaline earth metal reagent to obtain a distillation bottom substance; and (C) reacting said distillation bottom substance with carbon dioxide, wherein a higher aliphatic carboxylic acid is contained in an amount of from 0.05 mol to 1.0 mol per mol of the alkaline earth metal contained in said alkaline earth metal salt of an aromatic hydrocarboxylic acid or the sulfurized mixture thereof, a higher aliphatic amine is contained in an amount of from 0.05 mol to 1.0 mol per mol of the alkaline earth metal contained in said alkaline earth metal salt of an aromatic carboxylic acid or the sulfurized mixture thereof, or a higher aliphatic amide is contained in an amount of from 0.05 mol to 1.0 mol per mol of the alkaline earth metal contained in said alkaline earth metal salt of an aromatic carboxylic acid or the sulfurized mixture thereof, and said higher aliphatic carboxylic acid, said higher aliphatic amine or said higher aliphatic amide is added during the above steps (A) to (C) or to said petroleum additive, wherein said higher aliphatic carboxylic acid has 16 to 36 carbon atoms, said higher aliphatic amine has 16 to 36 carbon atoms and said higher aliphatic amide has 16 to 36 carbon atoms.

7. The process according to claim 6, wherein a sulfurization reaction is further conducted by adding an element sulfur in an amount of 0.05 to 0.5 mol per mol of said alkaline earth metal reagent during the steps (A) to (C).

8. A process for improving storage stability, heat stability and viscosity character of a petroleum additive comprising an alkaline earth metal salt of an aromatic hydroxycarboxylic acid or a sulfurized mixture thereof, which comprises the following steps:

(A) reacting a raw material mixture comprising a phenol, a dihydric alcohol, water and an alkaline earth metal reagent which is an oxide or hydroxide of an alkaline earth metal or a mixture thereof having a gram equivalent ratio per said phenol of not more than 0.99;

(B) distilling off said water and said dihydric alcohol until the remaining amount of said dihydric alcohol becomes not more than 0.4 mol per mol of said alkaline earth metal reagent and to obtain a distillation bottom substance; and (C) reacting said distillation bottom substance with carbon dioxide, wherein a higher aliphatic carboxylic acid, a higher aliphatic amine or a higher aliphatic amide is added during the above steps (A) to (C) or to said petroleum additive, wherein said aliphatic carboxylic acid has 16 to 36 carbon atoms, wherein said higher aliphatic carboxylic acid is contained in an amount of from 0.05 mol to 1.0 mol per mol of the alkaline earth metal contained in said alkaline earth metal salt of an aromatic hydrocarboxylic acid or the sulfurized mixture thereof, said higher aliphatic amine has 16 to 36 carbon atoms, wherein said higher aliphatic amine is contained in an amount of from 0.05 mol to 1.0 mol per mol of the alkaline earth metal contained in said alkaline earth metal contained in said alkaline earth metal salt of an aromatic carboxylic acid or the sulfurized mixture thereof, and said higher aliphatic amide has 16 to 36 carbon atoms, wherein said higher aliphatic amide is contained in an amount of from 0.05 mol to 1.0 mol per mol of the alkaline earth metal contained in said alkaline earth metal salt of an aromatic carboxylic acid or the sulfurized mixture thereof.

9. The process according to claim 8, wherein a sulfurization reaction is further conducted by adding an element sulfur in an amount of 0.05 to 0.5 mol per mol of said alkaline earth metal reagent during the steps (A) to (C).

10. A lubricating oil comprising the petroleum additive according to any one of claims 1 to 4 in an amount to give a base number of 5 mg KOH/g to 80 mg KOH/g.

* * * * *